(12) United States Patent
Reznik

(10) Patent No.: US 6,360,547 B1
(45) Date of Patent: Mar. 26, 2002

(54) METHOD AND APPARATUS FOR COOLING AIR TO CRYOGENIC TEMPERATURES FOR RECYCLING PROCESSES

(75) Inventor: Igor Reznik, Brooklyn, NY (US)

(73) Assignee: Crumbrubber Technology Co., Inc., Jamaica, NY (US)

( * ) Notice: Subject to any disclaimer, the term of this patent is extended or adjusted under 35 U.S.C. 154(b) by 0 days.

(21) Appl. No.: 09/480,556

(22) Filed: Jan. 7, 2000

(51) Int. Cl.⁷ .................................................. F25B 9/00
(52) U.S. Cl. .......................................................... 62/87
(58) Field of Search .......................... 62/87, 445, 446, 62/447

(56) References Cited

U.S. PATENT DOCUMENTS

| | | |
|---|---|---|
| 3,658,259 A | 4/1972 | Ledergerber |
| 3,718,284 A | 2/1973 | Richardson |
| 4,102,503 A | 7/1978 | Meinass |
| 4,142,688 A | 3/1979 | Johnson et al. |
| 4,180,004 A | 12/1979 | Johnson |
| 4,246,759 A | 1/1981 | Signoret |
| 4,273,294 A | 6/1981 | Hollely et al. |
| 4,607,796 A | 8/1986 | Enikopopov et al. |
| 4,625,922 A | 12/1986 | Brubaker et al. |
| 4,650,126 A | 3/1987 | Feder et al. |
| 4,726,530 A | 2/1988 | Miller et al. |
| 4,839,151 A | 6/1989 | Apffel |
| 5,042,970 A | 8/1991 | Rodgers |
| 5,057,905 A | 10/1991 | Matsumoto et al. |
| 5,097,905 A | 3/1992 | Goodwin |
| 5,115,983 A | 5/1992 | Rutherford, Sr. |
| 5,238,194 A | 8/1993 | Rouse et al. |
| 5,267,449 A | 12/1993 | Kiczek et al. |
| 5,323,624 A | 6/1994 | Schwalm |
| 5,368,240 A | 11/1994 | Bonnet |
| 5,492,657 A | 2/1996 | Danschikov et al. |
| 5,524,838 A | 6/1996 | Ellers et al. |
| 5,564,284 A | 10/1996 | Pugin |
| 5,634,599 A | 6/1997 | Khais et al. |

FOREIGN PATENT DOCUMENTS

JP    2-245683    9/1990

*Primary Examiner*—William Doerrler
*Assistant Examiner*—Malik N. Drake
(74) *Attorney, Agent, or Firm*—Collard & Roe, P.C.

(57) ABSTRACT

The method and apparatus for cryogenically freezing materials, such as rubber, food, plastics which provides a first air compressor for compressing the ambient air to between 5 and 6 atmospheres, a means for cooling the air back to an ambient temperature, a second compressor system for compressing the air to between 10 to 12 atmospheres, a second cooling system for cooling the air in two stages to 40° F., means for removing carbon dioxide and water moisture from the air following each of its compression and cooling stages, and an expansion turbine for allowing the compressed air to expand and cool to cryogenic temperatures that is fed to the material to be processed. A feedback loop having a valve is also provided so that a portion of the cooled and dried compressed air is fed back through a heat exchanger to the input of the first compressor after the cooled material has been stabilized in order to control the output temperature of the apparatus. Where rubber is being recycled, rubber chips become cryogenically embrittled and are fed through an airblock chamber into a hammermill to be pulverized into powder or crumb rubber.

20 Claims, 1 Drawing Sheet

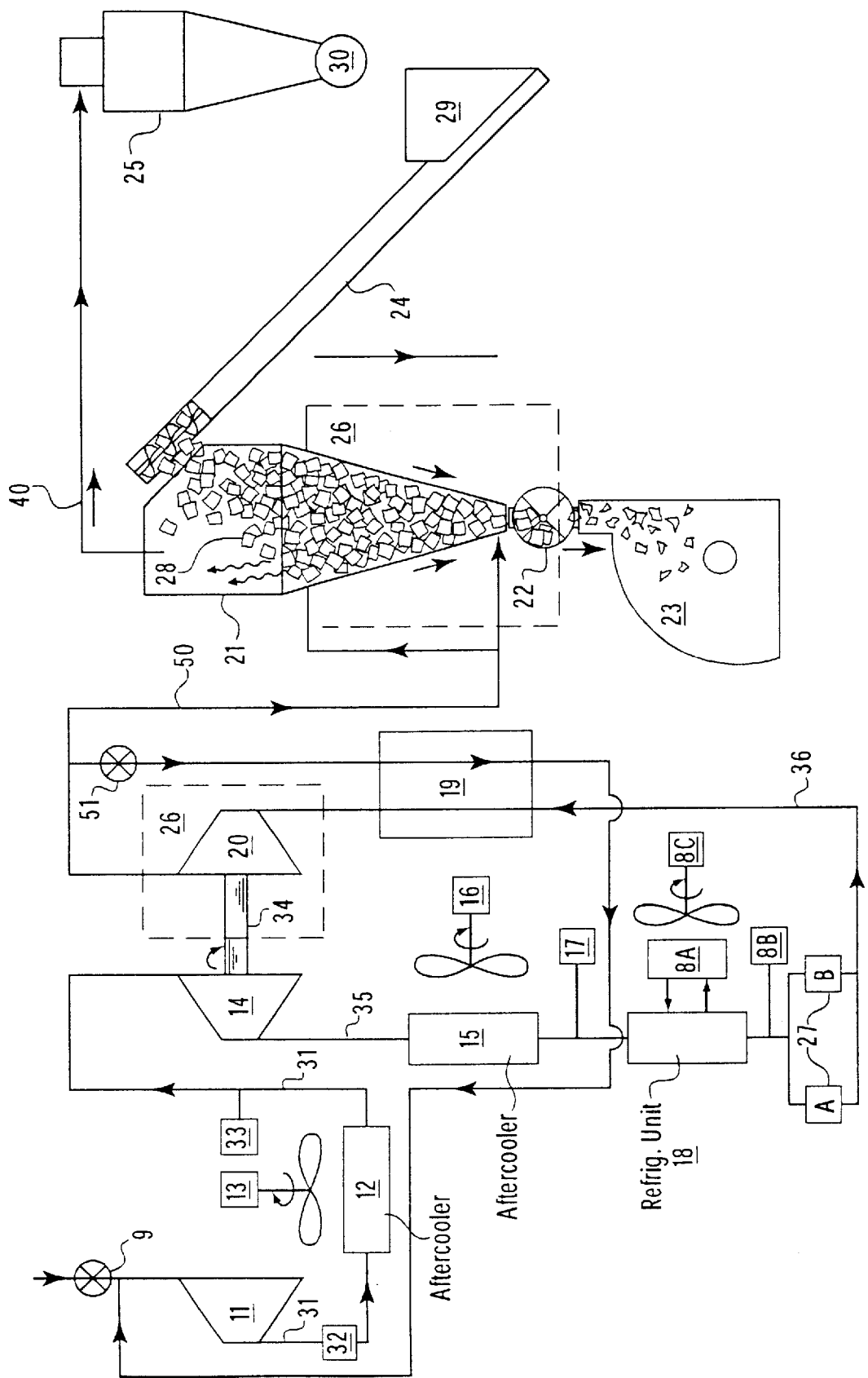

METHOD AND APPARATUS FOR COOLING AIR TO CRYOGENIC TEMPERATURES FOR RECYCLING PROCESSES

BACKGROUND OF THE INVENTION

1. Field of the Invention

The present invention relates to a method and apparatus for providing air at cryogenic temperatures to materials so that they can be processed for various uses.

More specifically, this invention relates to a method and apparatus for reliably and inexpensively producing air at cryogenic temperatures that can be used to embrittle the material of tires or for other embodiments, preserve food or treat emission gases of pollution producing machinery.

Various devices and apparatus for reducing air to cryogenic temperatures to embrittle materials such as synthetic rubber and the like for recycling tires has been expensive to operate and unreliable in operation.

Presently many conventional cryogenic recycling processes and apparatus require the use of liquid nitrogen or solid carbon dioxide to lower the temperature of the material to be recycled to a point where a subsequent impact or cutting produces a powder or granular material. These cryogenic processes are expensive to implement and operate due to the need for a large plant to produce the liquid nitrogen or solid carbon dioxide and the cost of energy required to operate the system. Thus, many of the cryogenic processes are uneconomical in view of the large amount of rubber and polystyrene waste that is currently produced and that has to be pulverized after it is embrittled.

It has been estimated that there are over 250 million scrap tires discarded every year in the United States and over two billion scrap tires which litter the landscape and have been dumped in landfills. These tires are often found in open dumps where they collect rain or run-off water and serve to promote the breeding of mosquitoes, rats, and other pests. The burning of these tires which in earlier years was permitted, has caused an enormous air pollution due to the noxious gases produced during combustion. By burying these tires in landfills, it has been found that the tires migrate to the surface over a period of time and become a hazard. Later prior art methods have included grinding up the tires or shredding them prior to dumping them in landfills. The conventional shredding and granulating equipment requires a great deal of maintenance, is subject to excessive wear, and is unreliable in operation.

Such devices are shown in U.S. Pat. No. 4,726,530 to Miller Miller uses the conventional shredding granulating and separating devices to produce a granular rubber that can be used either as a supplementary fuel when mixed with coal or in road building when mixed with asphalt paving material.

Tires which cost the motorist between $1.00 and $3.00 a piece to dispose of can now be recycled when granulated into a crumb type rubber for use as a supplementary material in fuel or in road building, and be sold at over $100.00 per ton for these uses. This provides an incentive for any recycling business to be able to convert large numbers of tires into a crumb-type rubber form that can be utilized for these end purposes, and sold at a profit. This will also provide an incentive to eliminate the dumping of tires at landfills and to have the crumb-type or granular rubber recycled to be used as either a fuel supplement or as a paving material. The Miller U.S. Pat. No. 4,726,530 describes the advantages of using granulated rubber as both a supplementary material for fuel and as an additive to asphalt, both uses which can more than accommodate the large number of tires that have to be recycled each year.

2. The Prior Art

The prior art methods for the disposal and/or recycling of scrap or discarded tires are exemplified by U.S. Pat. No. 4,142,688 issued Mar. 6, 1979; U.S. Pat. No. 4,180,004 issued Dec. 25, 1979 to A. O. Johnson; U.S. Pat. No. 4,726,530 issued Jul. 19, 1988 to N. P. Horton; U.S. Pat. No. 4,839,151 issued Jun. 13, 1989 to R. L. Barclay; U.S. Pat. No. 5,057,905 issued Oct. 15, 1991 to F. Apffel; U.S. Pat. No. 5,097,905 issued Mar. 10, 1992 to K. N. Murray; U.S. Pat. No. 5,115,983 issued May 26, 1992 to D. Rutherford, Sr.; and U.S. Pat. No. 5,492,657 issued Feb. 20, 1996 to Danschikov. In addition, efforts were also being made in other countries to address the pollution problem caused by scrap tires. Certain patents also describe cryogenic processes which are expensive to implement such as the patent to Richardson, U.S. Pat. No. 3,718,284, and Hollely, U.S. Pat. No. 4,273,294. Others have attempted to use different chemicals or spray washers, such as U.S. Pat. No. 5,492,657 which used ozone ($O_3$), U.S. Pat. No. 4,607,796 using compression of the rubber at cooler temperatures, U.S. Pat. No. 5,238,194 using an excessive flow of water through an open set of non-rotating grinding stones to produce the rubber particles, U.S. Pat. No. 5,115,983 which after shredding the tire, uses high pressure water jets to separate the shredded rubber from the cording and beading material of the tire, or U.S. Pat. No. 4,625,922, which uses elevated temperatures for comminution of the vulcanized rubber.

SUMMARY OF THE INVENTION

It is an object of the present invention to provide a method and apparatus for quickly lowering the temperature of rubber, polystyrene materials, or other materials which can include food stubs to cryogenic levels without the use of liquid nitrogen or any other chemical aids in a series of cooling steps whereby ambient air is cooled through several compression stages to −20° C. to −175° C. to allow the materials such as rubber to become brittle and thus easily pulverized for use as a fuel or additive. The method and apparatus of the invention take ambient air and compress it using either rotary screw compressors or any conventional compressor to a first compressive level of between 80–90 psia. Any oil resulting from the compression is then removed, and the air is cooled back to 107° F. through integral aftercoolers such as air or water coolers following its compression. This cooled air is then fed to a booster compressor powered by a turbo expander where the pressure of the air is boosted to over 180 psia. The air is then cooled by an air cooled aftercooler back to 100° F. to 110° F., and condensed water is removed in a water separator. The air is then further cooled to approximately 40° F. in a chiller using a typical freon refrigeration unit. Condensed water is then removed by an integral water separator attached to the evaporator. Heat is discharged to the atmosphere through a condenser, and the cool compressed air is further dried, and any carbon dioxide is removed in an absorption bed. The dried and purged air is then fed to an expansion turbine, where it cools down to approximately −150° F., and is then fed into the bottom portion of a vertical chamber.

If rubber tire chips are fed into the top portion of the chamber, then as the chips move downward through the vertical chamber, the air cooled to a temperature of about −150° F. passes upwardly through the chamber, and embrittle the rubber chips. At the bottom portion of the chamber, where the chips have been cooled to embrittled temperatures, they are then fed through an airlock chamber into a hammermill where the embrittled chips can be shattered and ground to the right consistency for the end user. The invention has the advantage that in the vertical chamber where the rubber chips are processed, the chips move downward against the counter current of cool air moving upward so that the coolest air is applied to the chips at the lower end of the chamber just before they are removed by the airlock connected to the hammermill. The cool air thus moving upward against the downwardly moving chips, continuously cools the chips to lower and lower temperatures until the chips reach an embrittlement temperatures at the bottom of the chamber. This system is very efficient and economical to operate and allows for a continuous flow of rubber chips to be processed without interruption.

It is therefore an object according to the present invention to provide an improved method and apparatus for cryogenically cooling chips in a continuous manner using super cooled air against a counter current movement of chips.

It is another object according to the invention to provide an air cooled cryogenic method and apparatus for cooling rubber chips or other materials that is simple in design, reliable in operation, and inexpensive in cost of operation.

BRIEF DESCRIPTION OF THE DRAWINGS

Other objects and features of the present invention will become apparent from the following detailed description considered in connection with the accompanying drawing which discloses the embodiments of the present invention. It should be understood, however, that the drawing is designed for the purpose of illustration only and not as a definition of the limits of the invention.

The figure shows a schematic diagram of the method and apparatus according to the invention for air cooling bulk material in a continuous manner to cryogenic temperatures.

DETAILED DESCRIPTION OF PREFERRED EMBODIMENTS

Turning now in detail to the drawing, the figure shows a compressor 11 for compressing ambient air fed into input 9 of the compressor. Compressor 11 may consist of a rotary screw compressor or any other type of compressor capable of compressing the ambient air to approximately 80 to 85 psia or about 5 to 6 atmospheres. The output of compressor 11 is fed through line 31 into a filter or separator 32 to remove any oil in the compressed air. The air is then cooled back to approximately 107° F. and it is fed from filter 32 into integral cooler 12. Aftercooler 12 may be an air or water cooler which uses a fan 13 to cool the air flowing through it. The first stage of compressed and cooled output air 32 is then fed into a water remover 33 to dry the air before it is fed into the input of a booster compressor 14. Compressor 14 is coupled by a shaft 34 to a turbo expander 20 so that booster compressor 14 can be powered by the turbo-expander to boost the air pressure to approximately 185 psia or over 10 atmospheres. The output of booster compressor 14 is fed through line 35 to an integral aftercooler 15 to cool the air back to approximately ambient 107° F. Aftercooler 15 can typically be a coil radiator type cooler which includes a fan 16 to move air through the radiator to accomplish the cooling. Any condensed water in the air is removed by a water separator 17. The dried air coming from aftercooler 15 is then fed to an air cooled refrigeration unit 18 in order to further cool the air to approximately 40° F. Air cooled refrigeration unit 18 can use a freon refrigeration unit 8A which includes a fan 8C, a freon compressor, and would be driven by the usual electric motor. It is not necessary to use a freon refrigeration but is recommended, especially for controlling temperature.

At the output of air cooled refrigeration unit 18 there is provided a water separator 8B which is attached to the evaporator of the refrigeration unit 18A, so that condensed water can be removed from the air. This dry air is then fed to a molecular sieve adsorption bed 27 consisting of A and B units for absorbing the rest of the water and carbon dioxide ($CO_2$) from the air. In this molecular sieve adsorption bed, one bed such as A is in service while the other bed such as B is being regenerated by heating a side stream of process air and purging the vessel. The vessels A and B are automatically switched through automatic valves controlled by the control system. The dried and purged air in line 36 is then fed into an expansion turbine 20 where it is cooled to a temperature of approximately –150° F. This is the same turbine expander that drives booster compressor 14 through shaft 34 using the natural expansion of purged and dried air coming through line 36 to the input of the expander. Expander 20 is heavily insulated by means of insulation jacket 26. The output cooled air from turbine 20 is then fed through line 50 to the bottom of a chamber heat exchanger 21 which is mounted vertically above a hammermill 23.

There is disposed between the output of chamber 21 and hammermill 23, an airlock 22 so that cryogenically cooled materials such as rubber chips will continuously be fed into the hammermill from chamber 21 without allowing any appreciable amount of cryogenically cooled air from line 50 from passing into the hammermill. As the cool air is fed into the bottom of chamber 21, materials such as rubber chips 28 will move downward in the chamber as the chilled air moves upward to cool the downwardly moving chips. The chips are fed into the top of chamber 28 through another airlock system by means of a feeder 24 which can comprise a screw conveyor such as that shown in U.S. Pat. No. 5,667,074 which is incorporated herein. In such a screw conveyor, the chips are typically fed into an input hopper 29 and under the movement of the screw conveyor are compressed as they move upward toward the top of chamber 21. The compression of the rubber chips also serves to form a seal or airlock preventing the cryogenically cooled air from escaping down the conveyor and out of hopper 29.

The air which is used to the cool chips 28 in chamber 21 is passed out of the top of the chamber through line 40 to a cyclone cleaner 25 which cleans the air before it is released into the atmosphere. The air leaving the chamber is preferably 5° C. less than the temperature of the material entering the chamber. Any loose chips of rubber or rubber dust is collected at the bottom of cyclone 25 and fed back into hopper 29.

Also coupled to the output of turbo expander 20 is a valve 51 which feeds back a portion of the cryogenically cooled, dried and purged air to the input of compressor 11 so that the air being drawn in through input line 9 can be partially cooled by any excess cooled air not required for cooling the chips. Moreover, as cool air passes through heat exchange 19, it cools the incoming air in line 36 entering the input of expander 20. Thus, valve 51 serves as a temperature control valve in the apparatus.

Initially, when the chips are first loaded into chamber 21 and the system is turned on, as the air approaches –150° F. to –160° F. after a period of time, and the initial charge of chips 28 begin to cool down to embrittlement, valve 51 can then be opened to bleed off some of the cool air that is not required as the chips begin to move downward through airlock 22 into hammermill 23. Valve 51 can be adjusted as needed until the proper flow of chips through chamber 21 to hammermill 23 has been established. The movement of the chips through airlock 22 can also be controlled so that the proper flow of chips can be established at the proper temperature of embrittlement before being pulverized or made into crumb rubber by hammermill 23.

Suitable insulation will also be coupled to cooling line 50, chamber 21, hammermill 23, and wherever else it is needed to maintain the cool temperatures required for embrittling the material contained in chamber 21. After the material passes through hammermill 23, the steel and fiber will be separated, and the material will then be loaded into bags or trucks and distributed to the end users.

As described earlier, the molecular sieve absorption bed 27 which removes the $CO_2$ in the dried air, prevents the $CO_2$ from becoming dry ice as the dried air 36 enters turbo expander 20. Dry ice could possibly damage the turbine blades in expander 20 if the dry ice was not removed by the absorption bed system.

The chips which are fed into chamber 21 preferably can be one-quarter of an inch, to 3"×3" sizes which can be easily cooled down as the chips move downward through the uprushing cryogenically cooled air. If smaller sizes are used, it is easier for the cryogenically cooled air entering the bottom of chamber 21 to permeate through the chip and thus the chips can flow faster through the chamber, into hammermill 23.

The chips which are deposited in chamber 21 have been previously granulated by typical grinding and granulation equipment. Chips 28 may contain fabric cording or steel banding which will then be separated by fabric and magnetic separators such as that shown in U.S. Pat. No. 5,667,074.

Chamber 21 can be formed in any shape to accept raw materials such as chips. This gives the cryogenically cooled air an opportunity to mix with chips 28 as it becomes heated by the warmer chips moving down through the chamber. Thus, chamber 21 serves as a heat exchanger to utilize all of the cold air from pipe 50 to chill the material, and the air preferably exits the opposite end of the chamber at ambient temperature. In this continuously operating embodiment of the invention, it is possible to chill and pulverize the tires into a crumb rubber or other usable product at a cost of between $20 to $30 per ton of energy cost. Moreover, since each tire contains about five pounds of steel and about one pound of fiber for a 20 pound tire, the steel and fiber can also be recycled by selling these products to end users.

The cooling apparatus and method of the present invention can also be used for the processing of other materials such as food where a rapid chilling of the food products such as fruit, meat, fish or any perishable product is required without destroying the organic texture of the food when it is refrigerated. In this case, an applicable food processing chamber and packaging equipment would be connected to the freezer.

While only a single embodiment of the present invention has been shown and described, it is to be understood that many changes and modifications may be made thereunto without departing from the spirit and scope of the invention as defined in the appended claims.

What is claimed is:

1. A continuous flow apparatus for preparing materials that have to be frozen or embrittled comprising
   first compression means for compressing ambient air;
   first cooling means for cooling the compressed air to ambient temperatures;
   second compressor means for further compressing the air to an elevated pressure at a multiple of the air compressed by said first compressor;
   a second cooling means coupled to said second compressor for cooling the air to ambient temperature;
   means for removing water and $CO_2$ from the compressed air;
   expansion means coupled to the output of said second cooling means for allowing the air to expand and cool to cryogenic temperatures;
   a material holding chamber having a material outflow at its bottom and a material input at its top; and
   wherein said cryogenic air is fed into the bottom of said chamber adjacent to the material output so that said cryogenic air will purge through the material to the top of said chamber as the material moves downwardly through the chamber to its output.

2. The continuous flow apparatus as recited in claim 1, additionally comprising an airlock disposed at the bottom of said material holding chamber for preventing said cryogenic air from escaping at the bottom of said chamber, but permitting the material to be processed through the bottom of the chamber.

3. The continuous flow apparatus as recited in claim 2, additionally comprising a hammermill coupled to the output of said airlock for receiving and pulverizing the embrittled material coming from said chamber and airlock.

4. The continuous flow apparatus as recited in claim 3, additionally comprising a feedback loop coupled to the output of said expansion means and said feedback loop having its output coupled to the input of said first compression means, and valve means disposed in said feedback loop for controlling the temperature and the amount of cryogenic air fed back to said first compression means.

5. The continuous flow apparatus as recited in claim 4, additionally comprising cleaning means coupled to the top of said chamber for receiving and cleaning the air exiting from said chamber.

6. The continuous flow apparatus as recited in claim 2, additionally comprising a conveyor coupled to the material input of said chamber for feeding material into the input of said chamber in a continuous manner.

7. The continuous flow apparatus as recited in claim 1, wherein said means for removing carbon dioxide comprises a molecular sieve adsorption bed.

8. The continuous flow apparatus as recited in claim 7, wherein said adsorption bed comprises at least two bed members wherein one bed member is coupled to the air being processed while at least another of said bed members is being purged of the carbon dioxide gas.

9. The continuous flow apparatus as recited in claim 1, wherein said first cooling means comprises an air cooled after cooler.

10. The continuous flow apparatus as recited in claim 1, wherein said second cooling means comprises an air cooled refrigeration unit.

11. The continuous flow apparatus as recited in claim 10, wherein said first compressor produces air at at least 85 psia, and said second compressor compresses the air to 185 psia; and wherein said first and second coolers cool the air at its output to at least 107° F., and said refrigeration unit cools the air to approximately 40° F., and said expansion means cools the air to approximately −150° F.

12. The continuous flow apparatus as recited in claim 1, wherein said means for removing water from said air comprises a water separator coupled to the output of said first cooling means.

13. The continuous flow apparatus as recited in claim 11, wherein said means for removing water from said air is coupled to the output of said second cooling means.

14. The continuous flow apparatus as recited in claim 1, wherein said expansion means comprises a turbine expander having a drive shaft coupled to said second compressor for driving said compressor upon the expansion of said compressed air.

15. A continuous flow method for preparing materials for freezing or embrittlement at cryogenic temperatures comprising the steps of first compressing air to between 5 and 6 atmospheres, and cooling the air to ambient temperatures;

compressing the air a second time to over 10 atmospheres and re-cooling the air to ambient temperatures;

removing water and $CO_2$ from the compressed air;

expanding the air in an expansion chamber so that the air will drop in temperature to approximately −150° F.; and feeding the cryogenically cooled air into a material holding chamber to cool the material as it moves downwardly through the chamber.

16. The method as recited in claim 15, wherein following said first step of compressing the air, additionally comprising the step of removing the water from the air following its compression.

17. The method as recited in claim 16, wherein said step of re-cooling the air comprises air cooling the air in an after cooler to an ambient temperature, and further cooling the air in a refrigeration unit to approximately 40° F.

18. The method as recited in claim 17, wherein said step of removing carbon dioxide comprises using a multiple bed molecular sieve absorption unit, wherein while one bed is removing the $CO_2$ and water while the other bed is being regenerated by heating it with a side stream of process air and purging the $CO_2$ and water from the bed.

19. The method as recited in claim 15, further comprising the steps of:

providing a hammermill coupled to the output of said material chamber; and disposing the material chamber above the hammermill, so that the material contained in the chamber moves downwardly into the hammermill while the cryogenically cooled air moves upwardly through the material to absorb the heat in the material.

20. The method as recited in claim 19, additionally comprising providing an airlock between said chamber and said hammermill to prevent the cooled air from escaping into said hammermill.

* * * * *